(12) United States Patent
Barth et al.

(10) Patent No.: US 9,587,648 B2
(45) Date of Patent: Mar. 7, 2017

(54) BLOWER

(71) Applicant: Andreas Stihl AG & Co. KG, Waiblingen (DE)

(72) Inventors: Christian Barth, Korb (DE); Markus Hittmann, Weinstadt (DE); Cornelius Gindele, Plochingen (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 0 days.

(21) Appl. No.: 15/003,579

(22) Filed: Jan. 21, 2016

(65) Prior Publication Data
US 2016/0208822 A1 Jul. 21, 2016

(30) Foreign Application Priority Data
Jan. 21, 2015 (DE) .................. 10 2015 000 732

(51) Int. Cl.
| | |
|---|---|
| F04D 29/66 | (2006.01) |
| F04D 25/06 | (2006.01) |
| F04D 25/08 | (2006.01) |
| F04D 29/32 | (2006.01) |
| F04D 29/54 | (2006.01) |
| F04D 19/00 | (2006.01) |
| F04D 29/52 | (2006.01) |
| A01G 1/12 | (2006.01) |
| E01H 1/08 | (2006.01) |

(52) U.S. Cl.
CPC .......... *F04D 29/667* (2013.01); *A01G 1/125* (2013.01); *E01H 1/0809* (2013.01); *F04D 19/002* (2013.01); *F04D 25/068* (2013.01); *F04D 25/086* (2013.01); *F04D 29/325* (2013.01); *F04D 29/522* (2013.01); *F04D 29/545* (2013.01)

(58) Field of Classification Search
CPC .... F04D 29/667; F04D 19/002; F04D 25/068; F04D 29/325; F04D 29/552; F04D 29/545; A01G 1/125
See application file for complete search history.

(56) References Cited

U.S. PATENT DOCUMENTS

| | | | |
|---|---|---|---|
| 2012/0076672 A1* | 3/2012 | Binder | .................. F04D 25/084 417/234 |
| 2014/0140861 A1* | 5/2014 | Pellenc | .................. A01G 1/125 417/44.1 |

(Continued)

FOREIGN PATENT DOCUMENTS

WO 2014030755 A1 2/2014

*Primary Examiner* — Dung Van Nguyen
(74) *Attorney, Agent, or Firm* — Walter Ottesen, P.A.

(57) ABSTRACT

A blower has a blower tube and a fan unit that conveys an air flow through the blower tube. The fan unit has a fan having a fan axis. The fan conveys the air flow in the direction of the fan axis. The air flow exits the blower tube in an outflow direction at a tube aperture. The handle has on its lower side a grasping point, which in the operating position of the blower, lies on a vertical axis through the blower's center of gravity. The tube aperture has a center axis that is oriented in the outflow direction. So that the forces received by the user at the handle during operation can be made smaller, it is provided for the spacing from the center axis of the tube aperture to the grasping point to be smaller than the spacing from the fan axis to the grasping point.

15 Claims, 2 Drawing Sheets

(56) References Cited

U.S. PATENT DOCUMENTS

| | | | |
|---|---|---|---|
| 2014/0230181 A1* | 8/2014 | Yamaoka | A01G 1/125 15/344 |
| 2014/0234130 A1* | 8/2014 | Yamaoka | A47L 5/24 417/234 |
| 2016/0265540 A1* | 9/2016 | Tirone | F04D 19/002 |
| 2016/0298635 A1* | 10/2016 | Su | G06F 1/3203 |

* cited by examiner

BLOWER

CROSS REFERENCE TO RELATED APPLICATION

This application claims priority of German patent application no. 10 2015 000 732.7, filed Jan. 21, 2015, the entire content of which is incorporated herein by reference.

BACKGROUND OF THE INVENTION

United States patent application publication 2014/0140861 discloses a handheld blower the blower tube of which is constructed to be straight. Arranged in the blower tube is a fan that conveys an air flow through the blower tube. The blower has a handle that is arranged above the blower tube. During operation, the user must take up through the handle both the force of the weight of the blower and also the recoil force produced by the blower air flow exiting therefrom.

SUMMARY OF THE INVENTION

It is an object of the invention to provide a blower in which the force to be taken up by the user during operation is reduced.

This object is achieved by a blower having: a blower tube; a fan unit configured to convey an air flow through the blower tube during operation of the blower; the fan unit including a fan defining a fan axis; the fan being configured to convey the air flow in the direction of the fan axis; the blower tube having a blower tube aperture through which the air flow flows out of the blower tube in a tube outflow direction; a handle having a lower side facing the fan and a grasping point arranged on the lower side; the blower having an operating position and a center of gravity; the grasping point being disposed on a vertical axis through the center of gravity when the blower is in the operating position; the blower tube aperture defining a center axis oriented in the tube outflow direction; the center axis and the grasping point conjointly defining a spacing (a) between each other; the fan axis and the grasping point conjointly defining a spacing (b) between each other; and, the spacing (a) being smaller than the spacing (b).

During operation, the air flow leaves the blower tube through a blower tube aperture, in an outflow direction. The recoil force produced by the air flow acts at the blower tube aperture in the opposite direction to the outflow direction. The spacing between the center axis of the blower tube aperture and a grasping point which lies above the center of gravity exerts a moment on the blower that has to be taken up by the user. It is provided for the spacing from the center axis of the blower tube aperture to the grasping point to be smaller than the spacing from the fan axis to the grasping point. Because the center axis of the blower tube aperture is at a smaller spacing from the grasping point than the fan axis is from the grasping point, the moment generated by the recoil force is reduced by comparison with an arrangement in which the spacing from the center axis of the blower tube aperture to the grasping point corresponds to the spacing from the fan axis to the grasping point. At the same time, it is possible to arrange the fan below the grasping point, resulting in a favorable position for the center of gravity.

Preferably, in the operating position, the center axis of the blower tube aperture runs below the grasping point. As a result, during operation the torque that is exerted by the recoil force has the effect of moving the blower tube aperture downward in the operating position. This torque is countered by the deflection of the blower air flow out of the direction of the fan axis and into the outflow direction, resulting as a whole in a further reduction in the moment to be supported by the user. The angle formed by the center axis of the blower tube aperture and the fan axis is advantageously at least 3°, in particular at least 5°. An angle of between 5° and 20°, in particular of approximately 10°, has proved particularly advantageous. The air flow from the fan advantageously flows out in a fan outflow direction that runs parallel to the fan axis. The blower tube advantageously has a deflection portion in which the direction of flow is deflected from the direction of flow at the fan outflow aperture to the direction of outflow out of the blower tube. In order to achieve the minimum impairment of the blower air flow as a result of deflection in the deflection portion, it is provided for the blower tube to run in a bent shape in the deflection portion. This enables the losses in blower performance as a result of the deflection portion to be kept low.

In order to enable different nozzles to be placed on the blower tube, it is provided for the blower tube to have a straight portion. The deflection portion is preferably arranged in the direction of flow between the straight portion and the fan. The length of the straight portion is in this case at least half as great as the length of the deflection portion. Preferably, the length of the straight portion is at least as great as the length of the deflection portion. Preferably, the length of the straight portion is greater than the length of the deflection portion. As a result, the blower air flow exits from the blower tube in the direction of the straight portion. If an inclined exit of air is desired, a deflection nozzle may additionally be placed on the blower tube. Because the deflection portion is arranged between the straight portion and the fan, a relatively small spacing from the center axis of the blower tube aperture to the grasping point can be achieved. At the same time, there is still sufficient room for a user's hand to grasp the handle in the region of the grasping point. Preferably, the deflection section adjoins the downstream end face of the fan. The downstream end face of the fan is in this case located at the downstream side of a fan impeller or guide wheel of the fan.

Advantageously, in the operating position the handle is arranged above the fan. A favorable arrangement of an air intake aperture is produced if the fan takes in the air flow through an intake duct the longitudinal center axis of which forms an angle greater than 0° with the fan axis. The angle between the longitudinal center axis of the intake duct and the fan axis is advantageously from 0.5° to 10°.

Advantageously, the blower has a rigid housing on which the blower tube and the handle are constructed and in which the fan unit is arranged. Preferably, the aperture for blowing out of the blower tube is also provided on the rigid housing. The position of the handle, blower tube and fan unit in relation to one another is consequently predetermined in a manner fixed by the construction, and cannot be altered by the user. The fan unit advantageously includes a drive motor that is constructed as an electric motor and is arranged in the blower tube. This gives a compact construction. As a result of arranging the electric motor in the blower tube, the weight of the blower that has to be borne by the user at the handle is at the same time relatively high by comparison with blowers that have a drive motor arranged on a backpack-style carrier, with the result that the reduction in the moment exerted by the recoil force of the blower air flow at the handle is particularly advantageous for the user.

In order to achieve an ergonomic alignment of the handle in any operating position of the blower, it is provided for the handle to have a first portion and a second portion, wherein the longitudinal center axis of the first portion forms an angle greater than 0° with the longitudinal center axis of the second portion. The angle between the longitudinal center axis of the first portion and the longitudinal center axis of the second portion is preferably from approximately 15° to approximately 45°. The first portion, which is arranged closer to the blower tube aperture, forms a first angle with the center axis of the blower tube aperture, and the second portion, which is further away from the blower tube aperture, forms a second angle with the center axis of the blower tube aperture. The first angle is preferably smaller than the second angle. This results in ergonomic operation. The handle is more pronouncedly inclined in relation to the center axis of the blower tube aperture in the region that is further to the rear during operation than in the portion that is at the front during operation. In this arrangement, the first angle and the second angle open toward the side that is at the front during operation and faces the blower tube aperture. When the blower tube aperture is inclined downward, this gives a horizontal or slightly forwardly and upwardly inclined alignment of the portion of the angle grasped by the user. This results in an ergonomic arrangement. In this arrangement, the user advantageously grasps the handle in the first, front portion if the blower air flow is to be directed toward a region further away and in the second, rear portion if the blower air flow is to be directed toward a region in the immediate vicinity of the user.

Advantageously, at least one operator controlled element is arranged on the handle. In order to ensure, for any position of the blower, that the hands are held in an ergonomic position and that it is readily possible to reach the operator controlled element, it may be provided that, in the longitudinal portion of the handle in which the operator controlled element is arranged, the longitudinal center axis of the handle forms an angle of approximately 20° to approximately 45° with the center axis of the blower tube aperture. In this case, the handle is advantageously constructed to be straight over its entire length, with the result that the longitudinal center axis of the handle forms a straight line over the entire length of the handle. An angle of approximately 30° to approximately 40°, preferably approximately 35°, has proved particularly advantageous.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
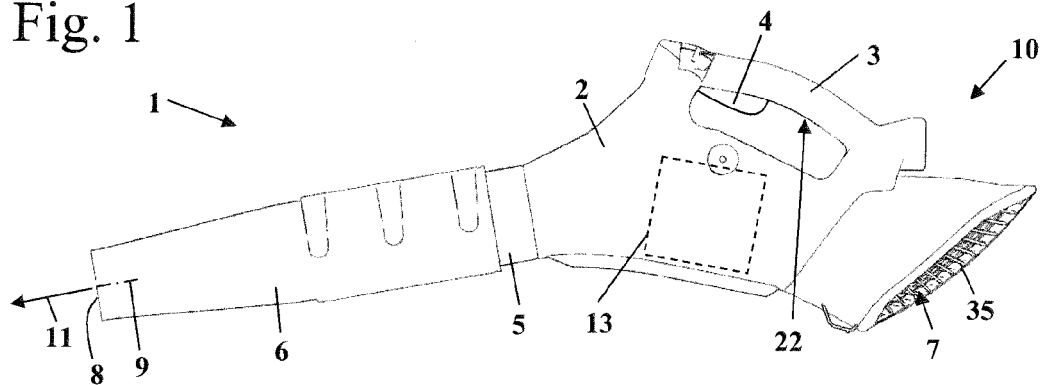
FIG. 1 is a side view of a blower.

FIG. 1 shows a handheld blower 1 in an operating position 10. The blower 1 serves for example to remove leaves or similar from paths and lawns. For this purpose, the user holds the blower 1 in a position that corresponds for example to the operating position 10 shown in FIG. 1, and pivots it out of this position such that an aperture 8 for blowing out moves in the approximately horizontal direction and/or in the approximately vertical direction. The blower 1 has a housing 2 made from rigid material, for example dimensionally stable plastic material. A handle 3 and a blower tube 5 are constructed on the housing 2 and are part of the housing 2. A nozzle 6 is held removably on the blower tube 5. Constructed on the nozzle 6 is an aperture 8 for blowing out, through which a blower air flow that is conveyed by the blower 1 leaves the blower 1 in a blowing-out direction 11. The nozzle 6 may be exchanged by the user in order to alter the direction of blowing out and to obtain a desired direction 11 of blowing out of the blower 1.

Arranged in the housing 2 is a fan unit 13, which is illustrated schematically in FIG. 1 and conveys the blower air flow. Arranged on the handle 3 is an operator controlled element 4, for operating the fan unit 13. An intake aperture 7 that is covered by a grille 35 is provided for the intake of air. The handle 3 has a lower side 22 that faces the fan unit 13 and points downward in the operating position 10.

Figure 2:
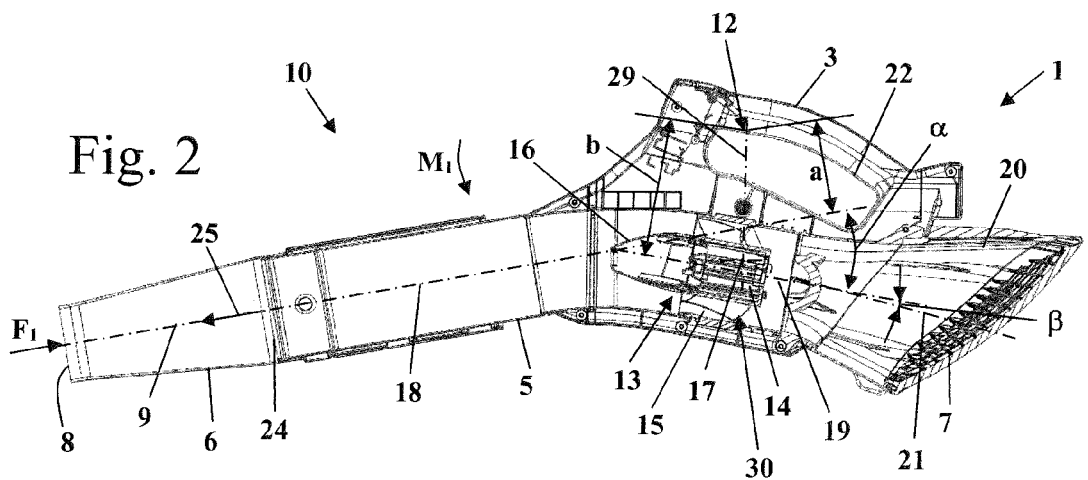
FIG. 2 shows a section through the blower from FIG. 1.

FIG. 2 shows the construction of the blower 1 in detail. The fan unit 13 includes a drive motor 14, which is arranged in the blower tube 5, and a fan 30. In the embodiment, the fan 30 includes a fan impeller 15 that is arranged in the blower tube 5 and is driven by the drive motor 14. The fan 30 may also include a plurality of fan impellers and/or one or more additional guide wheels. The fan unit 13 moreover includes a controller, not shown, which may be arranged outside the blower tube 5. The fan unit 13 has a fan axis 19 that corresponds to the axis of rotation of the fan impeller 15. In the region of the fan 30, the fan axis 19 coincides with the longitudinal center axis of the blower tube 5. Downstream of the fan impeller 15, there is arranged a guide element 16 which converges in the shape of a curved cone, and the external diameter of which lessens in the direction of flow. Constructed at the outer periphery of the drive motor 14 and the guide element 16 is an annular space in which the vanes of the fan impeller 15 are arranged and through which the air is conveyed during operation.

The fan 30 conveys the blower air flow in the direction of the fan axis 19. Consequently, the fan 30 is an axial or diagonal fan. In the embodiment, the fan 30 is constructed as an axial fan.

The blower 1 has a center of gravity 17 that, in the embodiment, is arranged in the region of the drive motor 14. The handle 3 has on its lower side 22 a grasping point 12, which lies on a vertical axis 29 through the center of gravity 17. The axis 29 is in this case arranged vertically in the operating position 10 when a user holds the blower 1 by the handle 3.

The nozzle 6 is placed on the blower tube 5 and in so doing reaches around the blower tube 5. The blower tube 5 has a blower tube aperture 24 at which the air exits from the blower tube 5 and enters the nozzle 6. The air flow leaves the blower tube 5 through the blower tube aperture 24 in an outflow direction 25. In the embodiment, the outflow direction 25 lies in the direction of a longitudinal center axis 18 of the blower tube 5 at the blower tube aperture 24. The blower tube aperture 24 has a center axis 9 that is oriented in the outflow direction 25 and runs through the geometric center of the blower tube aperture 24. The center axis 9 is at a spacing (a) from the grasping point 12. As shown in FIG. 2, the blower tube 5 is constructed to be bent downstream of the fan 30. Because of the bend in the blower tube 5, the fan axis 19 is at a spacing (b) from the grasping point 12 that is greater than the spacing (a). The spacing (b) is advantageously at least 110%, preferably at least 120%, in particular more than 130%, of the spacing (a).

The operating air that flows through the aperture 8 for blowing out and out of the blower 1 generates a recoil force $F_1$. Because of the spacing (a) between the center axis 9 and the grasping point 12, the recoil force $F_1$ exerts a moment $M_1$ about the grasping point 12, which brings about a downward movement of the aperture 8 for blowing out. The smaller the spacing (a), the smaller this moment $M_1$.

As shown in FIG. 2, the center axis 9 forms an angle α with the fan axis 19. The angle α is more than 0°, in particular at least 3°, preferably at least 5°. An angle α of approximately 10° has proved particularly advantageous. The angle α is in this case advantageously smaller than 20°. As a result of this, too great a deflection of the blower air flow is avoided. The intake aperture 7 is connected to the upstream side of the fan 30 by way of an intake duct 20. The intake duct 20 has a longitudinal center axis 21 that is likewise inclined in relation to the fan axis 19. The longitudinal center axis 21 forms an angle β with the fan axis 19 that is more than 0°. The angle β may be for example approximately 0.5° to 10°. The longitudinal center axis 21 of the intake duct 20 in this case runs downward in the operating position 10, from the fan 30 in opposition to the direction of flow, that is, toward the intake aperture 7.

Figure 3:
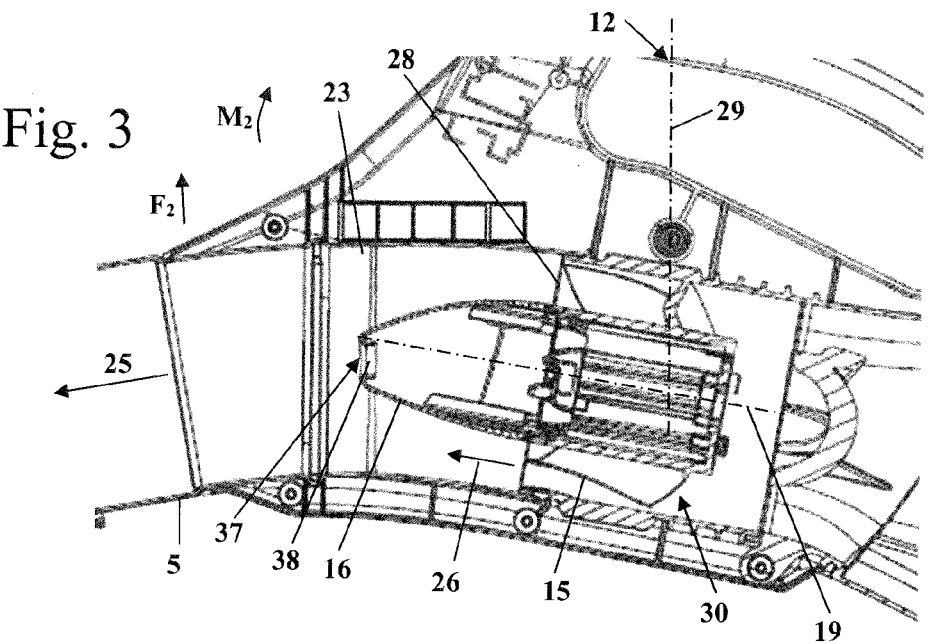
FIG. 3 shows the region of the fan unit of the blower from FIGS. 1 and 2, in an enlarged sectional illustration.

As FIG. 3 shows, a deflection portion 23 of the blower tube 5 is arranged at the downstream end face 28 of the fan 30. In the embodiment, the guide element 16 is arranged in the deflection portion 23. The guide element 16 has a downstream end face 37. The end face 37 has an aperture 38 that serves to take in cool air for the drive motor 14. As shown in FIG. 3, the aperture 38 is arranged adjacent to the fan axis 19 but, in the embodiment according to FIG. 3, is not intersected by the fan axis 19.

The blower air flow leaves the fan 30 at the downstream end face of the fan 30, in a fan outflow direction 25. In the embodiment, the deflection portion 23 runs in a bent shape. In the deflection portion 23, the direction of flow of the blower air flow is deflected from the fan outflow direction 26 to the direction 25 of outflow from the blower tube aperture 24 (FIG. 2). As a result of the even curvature of the deflection portion 23, the losses in blower performance here that result from the deflection are relatively low. The end face 28 is in this case the downstream end face of the fan impeller 15. If the fan 30 additionally includes guide wheels, then the end face 28 is the downstream side of the downstream fan impeller or guide wheel. Because of the deflection of the direction of flow from the fan outflow direction 26 to the outflow direction 25, the blower air flow exerts a deflection force $F_2$ on the blower tube 5. The deflection force $F_2$ brings about a moment $M_2$, opposed to the moment $M_1$ (FIG. 2), at the grasping point 12. The result is that because of the deflection portion 23, the moment acting at the grasping point 12 and to be taken up by the user is additionally reduced.

Figure 4:
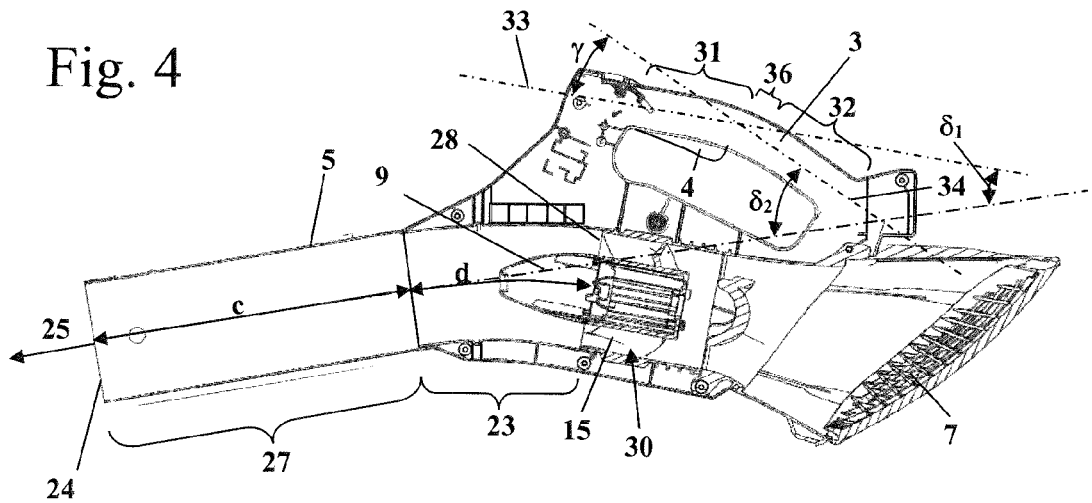
FIG. 4 is a simplified sectional illustration of the blower according to FIG. 2, with no nozzle arranged on the blower tube.

As shown in FIG. 4, in the direction of flow a straight portion 27 adjoins the deflection portion 23. The deflection portion 23 has a length (d), measured in the center of the deflection portion 23 and in the direction of flow. The length (c) of the straight portion 27 is at least half as great, in particular at least as great as the length (d). In this context, the length (c) is also measured in the center of the straight portion 27 and in the direction of flow. In the embodiment, the length (c) of the straight portion 27 is greater than the length (d). In this arrangement, the length (c) is measured from the downstream end face of the deflection portion 23 to the blower tube aperture 24.

FIG. 4 also shows in detail the shape of the handle 3. The handle 3 has a first portion 31 and a second portion 32. The portions 31 and 32 are in each case constructed to be approximately straight and are connected to one another by way of an arcuate region 36. The first portion 31 has a longitudinal center axis 33 that forms a first angle δ1 with the center axis 9 of the blower tube aperture 24. The angle δ1 is advantageously from approximately 10° to approximately 30°. In the embodiment, an angle δ1 that is between 15° and 25° is provided.

The second portion 32 of the handle 3 has a longitudinal center axis 34 that forms a second angle δ2 with the center axis 9 of the blower tube aperture 24. The angle δ2 is larger than the angle δ1 and may for example be from 25° to 65°. In the embodiment, an angle δ2 of between 40° and 50° is provided. In this arrangement, the first portion 31 is arranged closer to the blower tube aperture 24 than the second portion 32. The second portion 32 is closer to the intake aperture 7 than the first portion 31. The operator controlled element 4 is arranged on the first portion 31. The two portions 31 and 32 are inclined in relation to one another. The two longitudinal center axes 33 and 34 form an angle γ of from approximately 15° to approximately 45°. The angle γ is in particular from approximately 25° to approximately 35°.

The fact that the first portion 31, which is at the front from the point of view of the user, is less inclined in relation to the center axis 9 of the blower tube aperture 24 than the second portion 32, which is at the rear from the point of view of the user, produces an ergonomic operation. If the user would like to direct the blower air flow toward a point that is relatively far away, he or she can grasp the handle 3 at the first portion 31. The relatively small inclination of the first portion 31 has the result that, when the flow of blower air exits flat, the hands are held in an ergonomic position. If the user would like to direct the blower air flow to a closer point, he or she can grasp the handle 3 at the second portion 32. In this case, the blower is pivoted counterclockwise, out of the position shown in FIG. 4, with the result that an ergonomic position of the second portion 32 that is only slightly inclined in relation to the horizontal is produced, with the outflow direction 25 directed more steeply downward.

Figure 5:
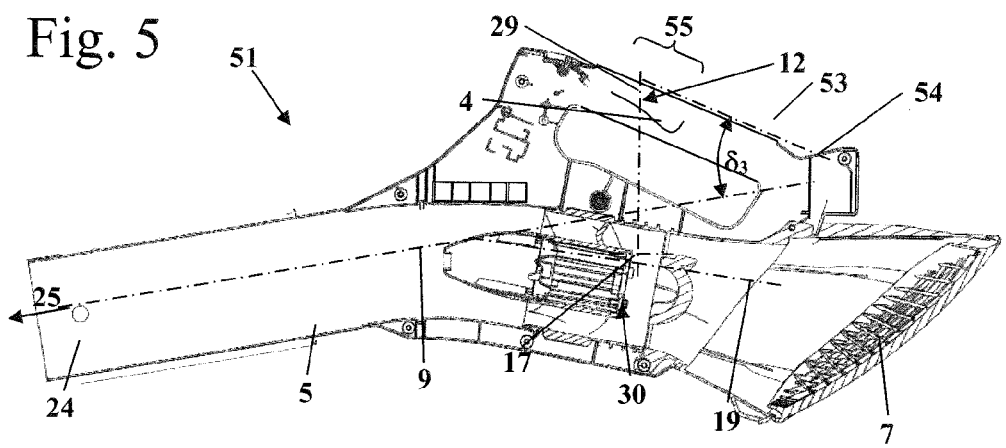
FIG. 5 is a sectional illustration through an embodiment of a blower in an illustration corresponding to FIG. 4; and,
FIG. 6 is a side view of an embodiment of a fan of a blower.

FIG. 5 shows a blower 51 that has a handle 53. The construction of the blower 51 corresponds substantially to that of the blower 1 from the foregoing figures. Like reference numerals designate mutually corresponding elements in all the figures. The handle 53 is constructed to be substantially straight over its entire length. The handle 53 has a longitudinal center axis 54 that forms an angle δ3 with the center axis 9 of the blower tube aperture 24. The angle δ3 is advantageously from approximately 20° to approximately 45°, in particular from approximately 30° to approximately 40°. An angle δ3 of between 30° and 35° is regarded as particularly advantageous. The handle 53 has a longitudinal portion 55 on which the operator controlled element 4 is mounted. The longitudinal center axis 54 of the handle 53 runs straight in the longitudinal portion 55 as well. The angle δ3 is between the angles δ1 and δ2 of the blower 1. The result is that the hands are held in an ergonomic position both for a position of the blower 51 in which the blower air flow is directed toward a region that is relatively far away and for a position in which the blower air flow is directed toward a region close to the user. In this arrangement, the user's hand may be arranged in the longitudinal portion 55 for any operating position, with the result that the operator controlled element 4 is always within the ready grasp of the user.

Figure 6:
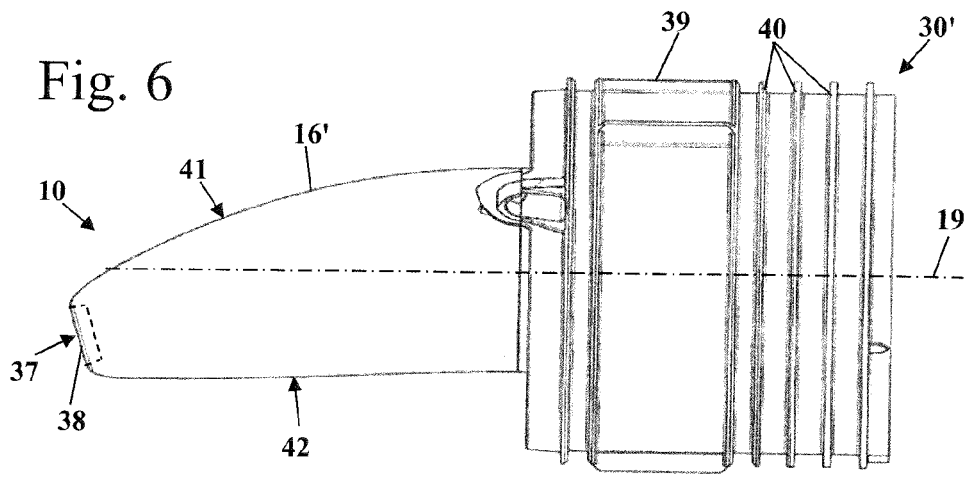

FIG. 6 shows an embodiment of a fan 30' that may be used instead of the fan 30 in a blower (1, 51). Mutually corresponding elements are designated by the same reference numerals as in the foregoing figures. The fan 30' has a blower tube portion 39 on the outside of which stiffening ribs 40 are arranged, for enhancing the stability of the fan 30'. A guide element 16' that corresponds substantially to the guide element 16 from the foregoing figures is arranged on the fan. However, the guide element 16' is more pronouncedly curved than the guide element 16. The guide element 16' has an upper side 41 that points upward in the operating position 10, and a lower side 42 that points downward in the operating position 10. The upper side 41, the lower side 42 and the fan axis 19 lie in one plane. In the embodiment according to FIG. 6, the fan axis 19 intersects the upper side 41 and is at a spacing from the aperture 38 in the end face 37. The lower side 42 is curved away from the fan axis 19 in the direction of flow. The lower side 42 may also run in approximately planar manner, wherein the spacing from the fan axis 19 advantageously increases in the direction of flow.

The curvature of the guide element (16, 16') is adapted to the bend in the blower tube 5. In this arrangement, the curvature is also dependent on the spacing of the fan (30, 30') from the deflection portion 23 (FIG. 4). In this context, as the spacing of the fan (30, 30') from the deflection portion 23 increases, the curvature advantageously becomes less. Advantageously, the closer to the deflection portion 23 the fan (30, 30') is arranged, the more pronounced the curve of the guide element (16, 16'). In the direction of flow, the guide element 16' is constructed to be longer than the guide element 16. The guide element 16' is advantageously arranged closer to the deflection portion 23 than the guide element 16, and for this reason is more pronouncedly curved than the guide element 16.

It is understood that the foregoing description is that of the preferred embodiments of the invention and that various changes and modifications may be made thereto without departing from the spirit and scope of the invention as defined in the appended claims.

What is claimed is:

1. A blower comprising:
a blower tube;
a fan unit configured to convey an air flow through said blower tube during operation of the blower;
said fan unit including a fan defining a fan axis;
said fan being configured to convey said air flow in the direction of said fan axis;
said blower tube having a blower tube aperture through which the air flow flows out of said blower tube in a tube outflow direction;
a handle having a lower side facing said fan and a grasping point arranged on said lower side;
the blower having an operating position and a center of gravity;
said grasping point being disposed on a vertical axis through said center of gravity when the blower is in said operating position;
said blower tube aperture defining a center axis oriented in said tube outflow direction;
said center axis and said grasping point conjointly defining a spacing (a) between each other;
said fan axis and said grasping point conjointly defining a spacing (b) between each other; and,
said spacing (a) being smaller than said spacing (b).

2. The blower of claim 1, wherein said center axis extends below said grasping point when the blower is in said operating position.

3. The blower of claim 1, wherein said center axis of said blower tube aperture and said fan axis conjointly enclose an angle ($\alpha$) of at least 3°.

4. The blower of claim 1, wherein;
said fan is configured to convey said air flow in a fan outflow direction running parallel to said fan axis; and,
said blower tube has a deflection section configured to redirect said air flow from said fan outflow direction to said tube outflow direction.

5. The blower of claim 4, wherein said blower tube runs in an inflected manner in said deflection section.

6. The blower of claim 4, wherein:
said blower tube has a straight section having a length (c);
said deflection section is arranged between said straight section and said fan with respect to the flow direction of said air flow;
said deflection section has a length (d); and,
said length (c) is at least half as long as said length (d).

7. The blower of claim 4, wherein:
said fan has a downstream end face; and,
said deflection section adjoins said downstream end face of said fan.

8. The blower of claim 1, wherein said handle is arranged above said fan when the blower is in said operating position.

9. The blower of claim 1 further comprising:
an intake channel defining a longitudinal center axis;
said fan is configured to draw in an air flow via said intake channel; and,
said longitudinal center axis and said fan axis conjointly enclose an angle ($\beta$) of greater than 0°.

10. The blower of claim 1 further comprising:
a rigid housing;
said blower tube and said handle being formed on said rigid housing; and,
said fan unit being arranged in said rigid housing.

11. The blower of claim 1, wherein said fan unit includes a drive motor configured as an electrical motor and arranged in said blower tube.

12. The blower of claim 1, wherein:
said handle has a first section defining a first longitudinal center axis and a second section defining a second longitudinal center axis; and,
said first longitudinal center axis and said second longitudinal center axis conjointly enclose an angle ($\gamma$) of greater than 0°.

13. The blower of claim 12, wherein said angle ($\gamma$) lies in a range from approximately 15° to approximately 45°.

14. The blower of claim 12, wherein:
said first section of said handle is arranged closer to said blower tube aperture than said second section;
said first section of said handle and said center axis of said blower tube aperture conjointly enclose a first angle ($\delta_1$);
said second section of said handle and said center axis of said blower tube aperture conjointly enclose a second angle ($\delta_2$); and,
said first angle ($\delta_1$) is smaller than said second angle ($\delta_2$).

15. The blower of claim 1 further comprising:
at least one operator-controlled element arranged on said handle in a first longitudinal section;
said handle defining a longitudinal center axis; and,
said longitudinal center axis in said first longitudinal section and said center axis of said blower tube aperture conjointly enclosing an angle ($\delta_3$) lying in a range from approximately 20° to approximately 45°.

\* \* \* \* \*